(12) United States Patent
Kim

(10) Patent No.: US 8,213,031 B2
(45) Date of Patent: Jul. 3, 2012

(54) IMAGE FORMING APPARATUS AND METHOD OF PREVENTING PRINTING ERROR FROM BEING GENERATED

(75) Inventor: Hyoung Tae Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1218 days.

(21) Appl. No.: 11/850,705

(22) Filed: Sep. 6, 2007

(65) Prior Publication Data

US 2008/0106750 A1 May 8, 2008

(30) Foreign Application Priority Data

Nov. 7, 2006 (KR) ........................ 10-2006-0109600

(51) Int. Cl.
*G06K 15/00* (2006.01)
*G06K 1/00* (2006.01)
*G06F 3/12* (2006.01)
*G06F 15/00* (2006.01)

(52) U.S. Cl. ...................... 358/1.14; 358/1.11; 358/1.12; 358/1.13; 358/1.15; 358/1.9

(58) Field of Classification Search ........ 358/1.11–1.18; 400/76; 715/201
See application file for complete search history.

(56) References Cited

U.S. PATENT DOCUMENTS

| | | | | |
|---|---|---|---|---|
| 5,065,358 A | * | 11/1991 | Yamakawa | 715/201 |
| 5,937,151 A | * | 8/1999 | Kadota | 358/1.15 |
| 6,771,378 B2 | * | 8/2004 | Akiyama et al. | 358/1.14 |
| 7,126,703 B1 | * | 10/2006 | Gillihan et al. | 358/1.14 |
| 7,410,311 B2 | * | 8/2008 | Suzuki et al. | 400/76 |
| 7,595,900 B2 | * | 9/2009 | Sakamoto | 358/1.13 |
| 7,656,548 B2 | * | 2/2010 | Hagiwara | 358/1.15 |
| 7,773,248 B2 | * | 8/2010 | Kadota | 358/1.16 |
| 2005/0128517 A1 | * | 6/2005 | Sakamoto | 358/1.15 |
| 2006/0095145 A1 | * | 5/2006 | Yamada | 700/19 |
| 2006/0119871 A1 | * | 6/2006 | Nakamura et al. | 358/1.12 |
| 2006/0268304 A1 | * | 11/2006 | Tanaka et al. | 358/1.13 |

FOREIGN PATENT DOCUMENTS

JP 2005-212337 8/2005

* cited by examiner

*Primary Examiner* — Satwant Singh
(74) *Attorney, Agent, or Firm* — Stanzione & Kim, LLP

(57) ABSTRACT

An image forming apparatus and a method of preventing a printing error thereof. If the image forming apparatus is able to recognize a printer language category when printing data has normal printer language category information, it analyzes the printing data using a printer language analyzer suitable for the printer language category, and normally prints data on a sheet of paper. If the printer language category information is distorted or lost such that the printer is unable to recognize the printer language category, the printer prints data on the paper using a basic printer language analyzer capable of supporting a text printing function, and at the same time determines whether an amount of the printing data for each line is higher than a maximum amount of printable data. Then, the printer determines occurrence of a printing error, stops the printing operation, and at the same time prints an error message. Therefore, when the printing data is analyzed by a printer language analyzer and is then printed, the printer prints the error message without printing all the printing data, to prevent papers or toners from being wasted.

14 Claims, 3 Drawing Sheets

IMAGE FORMING APPARATUS AND METHOD OF PREVENTING PRINTING ERROR FROM BEING GENERATED

CROSS-REFERENCE TO RELATED APPLICATIONS

This application claims the benefit of Korean Patent Application No. 2006-0109600, filed on Nov. 7, 2006 in the Korean Intellectual Property Office, the disclosure of which is incorporated herein in its entirety by reference.

BACKGROUND OF THE INVENTION

1. Field of the Invention

The present general inventive concept relates to an image forming apparatus, and more particularly to an image forming apparatus, and a method of preventing a printing error of the image forming apparatus.

2. Description of the Related Art

In general, image forming devices have been widely used to form a desired image on a paper. The image forming devices are classified into laser printers for forming an image using an electrostatic latent image and an inkjet printer for forming an image using an ink jet action. The image forming device is being used as a principal constituent element for a digital multi-function printer, a duplicating machine, and a facsimile machine, etc.

For example, the printer is connected to a host computer over a network. The host computer converts a variety of printing data (e.g., figure images and characters) into printer languages capable of being understood by the printer using a printer driver contained in the host computer itself, and transmits the converted result to the printer. Particularly, the host computer converts document information (e.g., printer language categories, file names, document structures, and printing options) into PJL (Page Job Language) data, and transmits the PJL data to a header of the printing data. There are a variety of printer languages capable of being understood by the printer, for example, PCL5e, PCL6, Postscript, etc.

Upon receiving the printing data, the printer analyzes a PJL command using a PJL parser (Print Job Language Parser), and determines category information of the printer language on the basis of the analyzed PJL command. The printer recognizes the category information of the printer language, selects a printer language interpreter according to each printer language category, analyzes data using the selected printer language interpreter, processes the data, and executes a printing action.

The PJL command is contained in the printing data, and is variable with usage environment factors (e.g., operating system (OS), application program, or interface, etc.) of the host computer. Therefore, the PJL command actually transmitted to the printer by the OS and the application program may be unexpectedly distorted even though the same document is used, or the PJL command may be lost via an interface between the host computer and the printer.

In this case, it is difficult to correctly determine the category information of the printer language. If the printer language category of the printing data to be printed is not correctly recognized, the printer analyzes the printing data using a basic printer language analyzer, such that unexpected data may be printed on the paper, and the printed data may not be a printing result intended by a user.

Particularly, most printers designate the printer language for supporting the text character printing action as a basic printer language, and perform the printing action. For example, if the printing data having a printer language of PCL6 is printed by the PCL5e printer language analyzer for supporting the text characteristic printing action, all the commands are difference from the PCL5e commands, such that all the commands are interpreted as text character data, and several tens of unexpected printing papers may occur. As a result, unnecessary papers or toners may be consumed.

SUMMARY OF THE INVENTION

The present general inventive concept provides an image forming apparatus capable of printing only a single error message without printing all printing data, when the printing data is analyzed by a basic printer language analyzer to support a text characteristic printing action when printer language category information cannot be determined due to distortion or loss of the printing data, and a method of preventing a printing error of the same.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept can be achieved by providing an image forming apparatus comprising a printer interface to receive printing data, a printing data analyzer to analyze the received printing data, a printing-content checking unit to check an amount of data printed on each line of a sheet of paper, a printing-error decision unit to compare the amount of data printed on each line with a maximum amount of data capable of being printed on a horizontal size of the paper, and determining presence or absence of a printing error according to the result of the comparison, a printer controller to perform a printing operation on the basis of the analyzed printing data, to stop the printing operation according to the printing error, and to print an error message, and a printer engine to perform the printing operation upon receiving a control signal from the printer controller.

If an allowable printing range is determined by a user, the printing error decision unit may determine the presence or absence of the printing error on the basis of a maximum amount of data extended or reduced by the allowable printing range.

The printing data may be printed in line units of the paper, and may include printer language category information indicating category information of the printer language and line feed information indicating the end of a corresponding line.

The printing data analyzer may analyze the received printing data, determine whether the printer language category information is normal or not, analyze the printing data using a printer language analyzer if the printer language category information is normal, and analyze the printing data using a basic printer language analyzer to support a text printing function if the printer language category information is abnormal.

The printing error decision unit may determine the presence of the printing error in the printing data, if the printing data analyzer analyzes the printing data using the basic printer language analyzer.

The printing-content checking unit may count the number of characters printed on a corresponding line of the paper until detecting the line feed information after the printing operation has begun.

The foregoing and/or other aspects and utilities of the present general inventive concept can be achieved by providing a method of preventing a printing error of an image forming apparatus, the method comprising receiving printing data, analyzing printer language category information of the received printing data, performing a printing operation using a printer language analyzer corresponding to the analyzed printer language category information, comparing an amount of data printed on each line of a paper with a maximum amount of data capable of being printed on a horizontal size of the paper, determining the presence or absence of a printing error according to the result of the comparison, and if the presence of the printing error is determined, stopping the printing operation, and printing an error message.

The method may further comprise if the amount of data printed on each line of the paper is larger than the maximum amount of data capable of being printed on the horizontal size of the paper, determining the presence of the printing error caused by distortion or loss of the printer language category information.

The maximum amount of data can be extended or reduced by a user.

The amount of data printed on each line of the paper may be equal to the number of characters counted from the beginning of the printing operation to an end time at which line feed information contained in the printing data indicates the end of the corresponding line.

The method may further comprise analyzing the printer language category information of the received printing data, determining whether the printer language category information is normal or not, analyzing/printing the printing data using a printer language analyzer if the printer language category information is normal, and analyzing/printing the printing data using a basic printer language analyzer for supporting a text printing function if the printer language category information is abnormal.

The method may further comprise determining the presence of the printing error in the printing data, if the printing data is analyzed by the basic printer language analyzer and is then printed.

The foregoing and/or other aspects and utilities of the present general inventive concept may also be achieved by providing an image forming apparatus including a printer engine to print printing data on a sheet of paper, and a printer controller to control the printer engine and to generate a signal representing a printing error according to an amount of the printing date printed in a line of the paper.

The foregoing and/or other aspects and utilities of the present general inventive concept may also be achieved by providing a method of an image forming apparatus, the method including controlling a printer engine to print printing data on a sheet of paper, and generating a signal representing a printing error according to an amount of the printing date printed in a line of the paper.

The foregoing and/or other aspects and utilities of the present general inventive concept may also be achieved by providing a computer-readable medium to contain computer-readable codes as a program to execute a method of controlling a printer engine of an image forming apparatus, the method including controlling a printer engine to print printing data on a sheet of paper, and generating a signal representing a printing error according to an amount of the printing date printed in a line of the paper.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
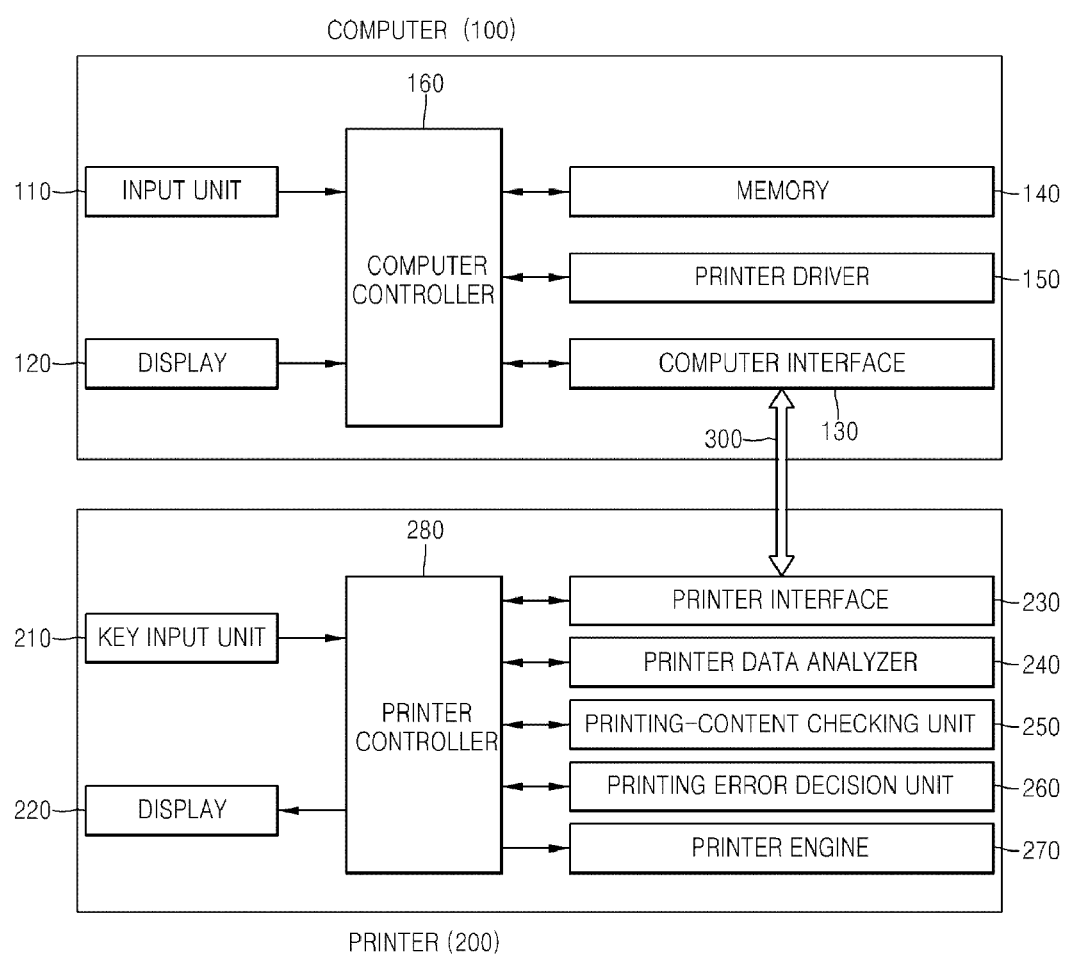
FIG. 1 is a block diagram illustrating an image forming apparatus according to an embodiment of the present general inventive concept.

Reference will now be made in detail to the embodiments of the present general inventive concept, examples of which are illustrated in the accompanying drawings, wherein like reference numerals refer to like elements throughout. The embodiments are described below to explain the present general inventive concept by referring to the figures.

FIG. 1 is a block diagram illustrating an image forming apparatus according to an embodiment of the present general inventive concept. Referring to FIG. 1, the image forming apparatus includes a computer 100 and a printer 200 connected to each other via a communication interface 300. In this case, the communication interface 300 may be set to a wired- or wireless-Local Area Network (LAN).

The computer 100 includes an input unit 110, a display 120, a computer interface 130, a memory 140, a printer driver 150, and a computer controller 150. In addition, the computer 100 further includes a ROM and a RAM to store data used or to be used in the computer 100.

The input unit 110 transmits a key input signal created by a user to the computer controller 160. The input unit 110 may be a keyboard, a mouse, a touch-panel, etc., to input command and data to the computer 100.

The display 120 is used as a general monitor to display operation status of the computer 100 according to a control signal of the computer controller 150.

The memory 140 stores an application program capable of constructing a variety of documents.

The printer driver 150 converts printing data corresponding to a document constructed by the application program into a language capable of being interpreted by the printer 200. The printer driver 150 provides a printing screen image associated with the document constructed by the application program. Particularly, a variety of document information (e.g., printer language category, file name, document structure, and printing option) of the printing data are converted into PJL data, such that the PJL data is transmitted to the header of the printing data.

The computer interface 130 is detachably connected to the printer 200, and provides a communication interface of the printer 200. The computer interface 130 transmits a variety of printing data (i.e., figure images and characters) capable of being understood by the printer and/or formed by the printer driver to the printer 200.

The computer controller 160 controls overall operations of the computer 100. For example, upon receiving a printing command of the printing data configured by the application program, the computer controller 160 drives the printer driver 150, such that the display 120 displays a printing screen image received from the printer driver 150.

In the meantime, the printer 200 includes a key input unit 210, a display 220, a printer interface 230, a printing data analyzer 240, a printing content checking unit 250, a printing error decision unit 260, a printer engine 270, and a printer controller 280.

The key input unit 210 includes a plurality of operation keys capable of selecting/establishing functions supported by the printer 200, and transmits key operation signals to the printer controller 280. The display 220 displays operation states of the printer 200 upon receiving a control signal from the key input unit 210 and the printer controller 280. The control signal may be generated according to the printing data received from the computer 100 through the computer interface 130 and the printer interface 230.

The printer interface 230 is detachably connected to the computer 100, and provides a communication interface for the computer 100. The printer interface 230 receives printing data received from the computer 100 via the computer interface 130.

The printing data analyzer 240 receives the printing data from the computer 100, and analyzes the printing data. In this case, the printing data analyzer 240 analyzes the received printing data. If the PJL command is normal, the printing data analyzer 240 analyzes the printing data using the printer language analyzer. If the PJL command is abnormal due to the distortion or loss of data or printing data, the printing data analyzer 240 analyzes the printing data using a different printer language analyzer as a basic printer language analyzer to support a text printing operation of the printing data. For example, the basic printer language analyzer supports a printing operation of printing a text included in the printing data.

Figure 2:
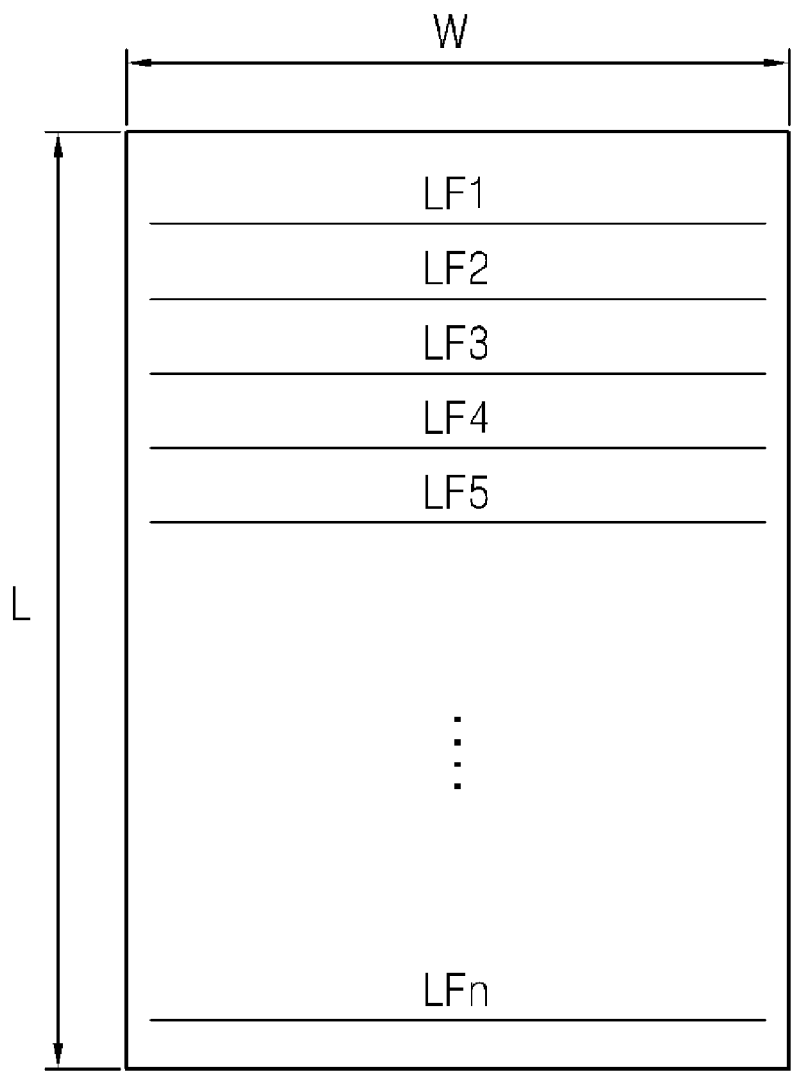
FIG. 2 is a conceptual diagram illustrating printing data of FIG. 1 printed on a sheet of paper in page-line units.

As illustrated in FIG. 2, the printing data is printed in page-line units (LF1, LF2, LF3, . . . , LFn) on a sheet of paper having a width W and a length L. The printing data includes a PJL command including printer language category information, a control code of a corresponding line, and line feed (LF) information indicating the end of a line. In this case, the control command can establish the size of a character, character shapes (e.g., an italic type or Ming-style type), and printing resolution during the printing mode of data. Also, the number of characters printed on the line is equal to or less than a horizontal size (W) of a page, and a line change is executed by the line feed information.

The printing content checking unit 250 counts the number of characters printed on each line to check an amount of data to be printed. In this case, the printing content checking unit 250 counts the number of characters printed on a corresponding line of the paper until detecting the line feed information when the printing action (operation) or after the printing action (operation) has begun.

The printing error decision unit 260 determines whether an amount of data printed on each line is greater than the horizontal size of the page, and determines the presence of a printing error if it is determined that the amount of data printed on each line is greater than the horizontal size of the page. In other words, if the amount of data printed on each line is less than a maximum amount of data capable of being printed on a horizontal size of the page, the printing error decision unit 260 determines that the printing data is normal. If the amount of data printed on each line is equal to or larger than the maximum amount of data capable of being printed on the horizontal size of the page, the printing error decision unit 260 determines that the printing data is abnormal due to the distortion or loss of the printing data, such that it determines the occurrence of the printing error. In this case, the user can freely determine the maximum amount of data capable of being printed on the horizontal size of the page. In this case, the printing error decision unit 260 determines the presence or absence of the printing error According to a user preference of the maximum amount of the data in a unit line. If the printing data is analyzed by the printing data analyzer 240 using the basic printer language analyzer, it is preferable that the printing error decision unit 260 may determine the presence or absence of the printing error on the basis of the printing data.

The printer controller 280 controls overall operations of the printer 200 using a control program. Particularly, the printer controller 280 interrupts the printing action if the occurrence of the printing error is determined by the printing error decision unit 260, and outputs an error message to print an error message on the paper. The printer controller 280 interrupts the printing operation when a signal of the printing data analyzer 240 representing that the PJL is abnormal.

The printer engine 270 prints the printing data on the paper according to a control signal of the printer controller 280.

As stated above, the printing data transmitted from the computer to the printer includes the PJL command capable of selecting a printer language analyzer capable of selecting suitable for the printer language category, interpreting the printer data, and performing the printing action. The PJL command includes specific information indicating which one of printer languages is indicated by the printing data.

However, if the PJL command is distorted or lost by many reasons, the printer is unable to recognize category information of the printer language. Therefore, the basic printer language analyzer, in which the printer language to support the text character printing is designated as the basic printer language, analyzes the printing data, such that the printing action is executed. Therefore, if the printing data having the printer language of PCL6 is printed by the PCL5e printer language analyzer capable of supporting the text character printing action, all the commands are different from the PCL5e commands, such that all the commands are interpreted by text characters, and undesired printing papers may be printed as many as several tens of papers, for example.

The printing data is printed in line units of the page. For this purpose, the printing data includes line feed information indicating the end of the line. Therefore, if the basic printer analyzer supports the printer language of the printing data, the printer language analyzer supports the line feed function to support the general text printing action, such that the characters are printed to be suitable for the page's horizontal size according to the line feed information, the current line is changed to the next line, and the printing action is continuously executed.

However, if the basic printer language analyzer does not support the printer language of the printing data, it is unable to analyze the line feed information, such that a large number of characters are printed on a single line. The present general inventive concept determines whether the number of characters printed on a single line is higher than the horizontal size of the page. If it is determined that the number of characters printed on a single line is higher than the horizontal size of the page, data is abnormal, the printing action is interrupted, and the printing error message is printed on the paper. As a result, the present general inventive concept can prevent undesired printing papers from being printed by several tens of papers, such that it can prevent papers and toners from being unnecessarily consumed.

Figure 3:
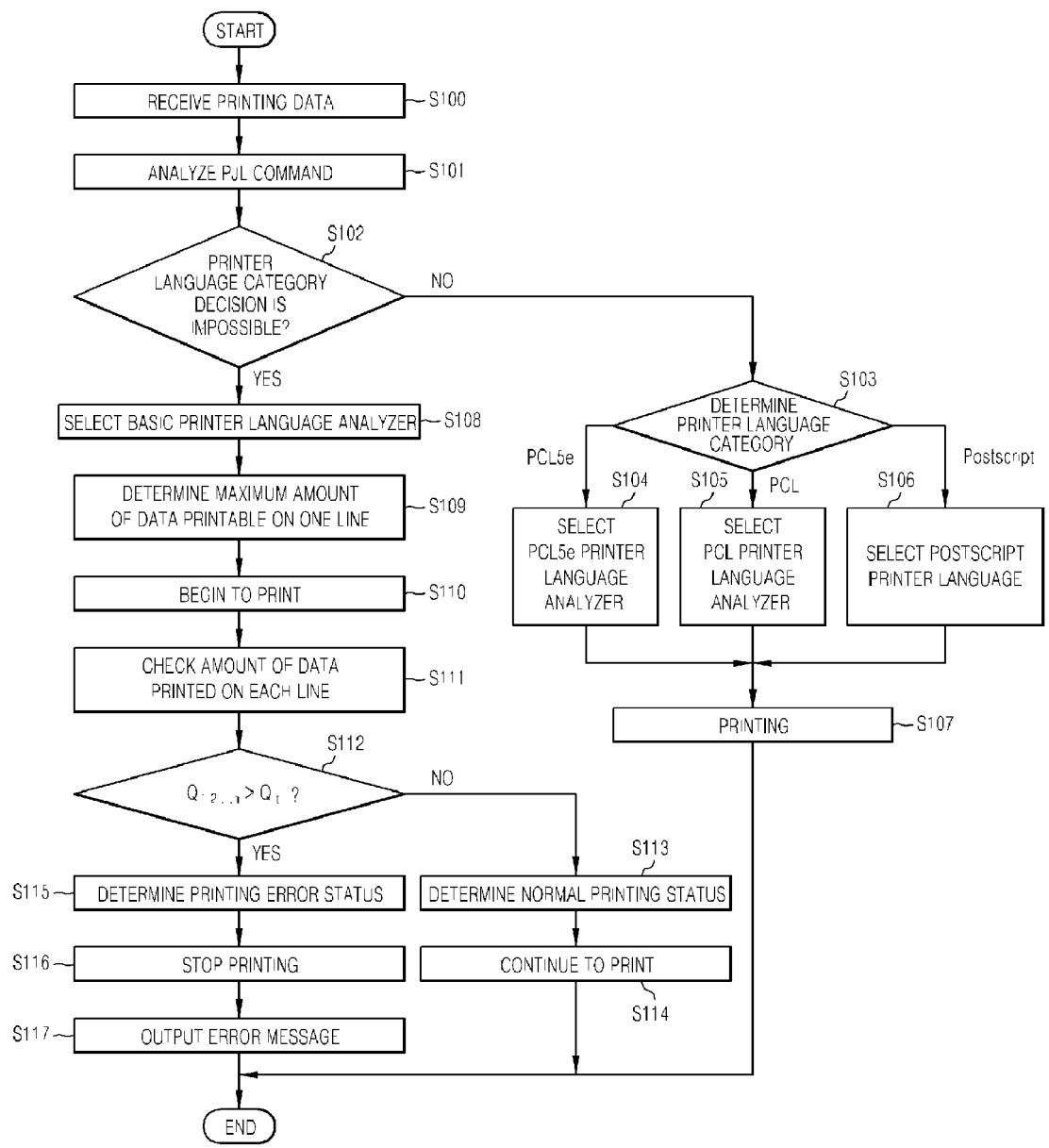
FIG. 3 is a flow chart illustrating a method of preventing a printing error of an image forming apparatus according to an embodiment of the present general inventive concept.

Referring to FIG. 3, a printer receives printing data from a computer at operation S100, and analyzes a PJL command of a header on the basis of the received printing data at operation S101.

The printer determines whether it is unable to recognize category information of a printer language due to distortion or loss of the PJL command according to the PJL command analyzed result at operation S102.

If it is determined that the category information of the printer language can be recognized when the PJL command was normal at operation S102, the category information of the printer language is determined at operation S103. If the printer language is indicative of a PCL5e at operation S103, a PCL5e printer language analyzer is selected by a printer language analyzer at operation S104. If the printer language is indicative of a PCL, a PCL printer language analyzer is selected by the printer language analyzer at operation S105. If the printer language is indicative of Postscript, a Postscript printer language analyzer is selected by the printer language analyzer at operation S106.

The printing data is interpreted by the printer language analyzer selected by the corresponding printer language, such that the printing action suitable for the analyzed printing data is executed at operation S107.

In the meantime, if it is unable to recognize the category information of the printer language due to the distortion or loss of the PJL command at operation S102, a basic printer language analyzer is selected by the printer language analyzer at operation S108. The printing data is interpreted by the selected basic printer language interpreter, and a maximum amount of data $Q_t$ which may be equal to the number of characters capable of being printed on a single line of the page according to the paper size is determined. In this case, the maximum amount of data can be extended or reduced by the user. For example, a printing allowable range can be established by the user, such that the maximum amount of data can be extended or reduce.

After determining the maximum amount of data, the printer begins to print data on the paper at operation S110, and detects an amount of data printed on each line of the page $Q_{1,2,\ldots,n}$ at operation S111. It is possible that the printer detects the amount of data to be printed when the basic printer language analyzer interprets the printing data.

It is determined whether the amount of data printed on each line is greater than the maximum amount of data at operation S112. If it is determined that the amount of data printed on each line is equal to or less than the maximum amount of data at operation S112, the printer determines a normal printing status, such that it continues to print data on the paper at operation S114. Otherwise, if it is determined that the amount of data printed on each line is higher than the maximum amount of data at operation S112, the printer determines the occurrence of the printing error. In other words, if the printer language of the printing data can be normally printed by the basic printer language analyzer, the printer prints characters suitable for the page horizontal size on a first line according to the line feed information contained in the printing data, goes to the next line (i.e., a second line), and continues to print data on the paper. However, if the basic printer language analyzer does not support the printer language of the printing data, it cannot interpret or analyze the line feed information, such that a large number of characters are printed on a single line, for example, on the first line.

If the occurrence of the printing error is determined, the printer immediately stops printing at operation S116, informs the user of an error message (e.g., "including corrupted data") indicating that the printing data has been abnormally printed at operation S117, and prints the error message on the paper.

The present general inventive concept can also be embodied as computer-readable codes on a computer-readable medium. The computer-readable medium is any data storage device that can store data which can be thereafter read by a computer system. Examples of the computer-readable media include read-only memory (ROM), random-access memory (RAM), CD-ROMs, magnetic tapes, floppy disks, optical data storage devices, and carrier waves (such as data transmission through the Internet). The computer-readable medium can also be distributed over network-coupled computer systems so that the computer-readable code is stored and executed in a distributed fashion through Internet or wire or wired network. Also, functional programs, codes, and code segments to accomplish the present general inventive concept can be easily construed by programmers skilled in the art to which the present general inventive concept pertains.

As is apparent from the above description, if the image forming apparatus according to the present general inventive concept is able to recognize the printer language category when the printing data has normal printer language category information, it analyzes the printing data using the printer language analyzer suitable for the printer language category, and normally prints data on the paper. If the printer language category information is distorted or lost such that the printer is unable to recognize the printer language category, the printer prints data on the paper using the basic printer language analyzer capable of supporting the text printing function, and at the same time determines whether an amount of the printing data for each line is higher than a maximum amount of printable data. Then, the printer determines the occurrence of the printing error, stops the printing operation, and at the same time prints the error message. Therefore, although the printing data is analyzed by a wrong printer language analyzer and is then printed, the printer according to the present invention prints only one error message without printing all the printing data, resulting in the reduction of unnecessary papers or toners.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A method of preventing a printing error of an image forming apparatus, the method comprising:
   receiving printing data;
   analyzing printer language category information of the received printing data;
   performing a printing operation using a printer language analyzer corresponding to the analyzed printer language category information;
   comparing an amount of data printed on each line of a paper with a maximum amount of data capable of being printed on a horizontal size of the paper, and determining the presence or absence of a printing error according to the result of the comparison;
   if the presence of the printing error is determined, stopping the printing operation, and printing an error message; and
   if the amount of data printed on each line of the paper is larger than the maximum amount of data capable of being printed on the horizontal size of the paper, determining the presence of the printing error caused by distortion or loss of the printer language category information.

2. The method of claim 1, wherein the maximum amount of data can be extended or reduced by a user.

3. The method of claim 1, wherein the amount of data printed on each line of the paper is equal to the number of characters counted from the beginning of the printing operation to an end time at which line feed information contained in the printing data indicates the end of the corresponding line.

4. The method of claim 1, further comprising:

analyzing the printer language category information of the received printing data, determining whether the printer language category information is normal or not, analyzing/printing the printing data using a printer language analyzer if the printer language category information is normal, and analyzing/printing the printing data using a basic printer language analyzer for supporting a text printing function if the printer language category information is abnormal.

5. The method of claim 4, further comprising:

determining the presence of the printing error in the printing data, if the printing data is analyzed by the basic printer language analyzer and is then printed.

6. An image forming apparatus comprising:

a printer engine to print printing data on a sheet of paper;

a printer controller to control the printer engine and to generate a signal representing a printing error according to an amount of the printing data printed in a line of the paper; and a printing-content checking unit to check the amount of data printed on the line when a PJL of the printing data is abnormal.

7. The apparatus of claim 6, wherein the printer controller controls the printer engine and generates the signal according to a comparison between the amount of the printing data and a maximum amount of data to be printed in the line.

8. The apparatus of claim 6, wherein the printer controller controls the printer engine and generates the signal according to the number of characters to be printed.

9. The apparatus of claim 6, wherein the printer controller controls the printer engine and generates the signal according to a state of a PJL of the printing data.

10. The apparatus of claim 6, further comprising:

a printing data analyzer to analyze the received printing data to determine a state of a PJL of the printing data.

11. The apparatus of claim 6, further comprising:

a printing-error decision unit to compare the amount of data printed on the line with a maximum amount of data capable of being printed on a horizontal size of the paper, and to determine presence or absence of the printing error according to the result of the comparison, wherein the printer controller controls the printer engine and generates the signal according to the determined printing error.

12. A method of an image forming apparatus, the method comprising:

controlling a printer engine to print printing data on a sheet of paper;

generating a signal representing a printing error according to an amount of the printing data printed in a line of the paper; and determining the amount of data printed on the line when a PJL of the printing data is abnormal.

13. A non-transitory computer-readable medium to contain computer-readable codes as a program to execute a method of controlling a printer engine of an image forming apparatus, the method comprising:

controlling a printer engine to print printing data on a sheet of paper;

generating a signal representing a printing error according to an amount of the printing data printed in a line of the paper; and determining the amount of data printed on the line when a PJL of the printing data is abnormal.

14. A method of preventing a printing error of an image forming apparatus, the method comprising:

receiving printing data;

analyzing the printer language category information of the received printing data, determining whether the printer language category information is normal or not, analyzing/printing the printing data using a printer language analyzer if the printer language category information is normal, and analyzing/printing the printing data using a basic printer language analyzer to support a text printing function if the printer language category information is abnormal;

comparing an amount of data printed on each line of a paper with a maximum amount of data capable of being printed on a horizontal size of the paper, and determining the presence or absence of a printing error according to the result of the comparison; and if the presence of the printing error is determined, stopping the printing operation, and printing an error message.

* * * * *